United States Patent [19]

Dunaway et al.

[11] Patent Number: 5,364,579
[45] Date of Patent: Nov. 15, 1994

[54] METHOD FOR PELLETIZING CALCINED CLAY

[75] Inventors: Weyman H. Dunaway, Sandersville; Elizabeth H. Garrett, Bartow; Dudley C. Rowe, Alpharetta, all of Ga.

[73] Assignee: ECC International Inc., Atlanta, Ga.

[21] Appl. No.: 419,198

[22] Filed: Oct. 10, 1989

[51] Int. Cl.$^5$ .................................................. B28C 3/00
[52] U.S. Cl. ................................... 264/82; 106/484; 106/485; 264/117; 264/140; 501/146
[58] Field of Search ............... 501/146; 264/82, 117, 264/140; 106/484, 485

[56] References Cited

U.S. PATENT DOCUMENTS

| | | | |
|---|---|---|---|
| 2,710,244 | 6/1955 | Bertorelli | 501/146 |
| 2,933,766 | 4/1960 | Bickford et al. | 264/140 |
| 3,012,050 | 12/1961 | Fox et al. | 501/146 |
| 3,014,836 | 12/1961 | Proctor | 162/181 |
| 3,140,326 | 7/1964 | Erck et al. | 264/117 |
| 3,403,041 | 10/1968 | Lyons et al. | 106/484 |
| 3,586,523 | 6/1971 | Fanselow et al. | 106/288 |
| 4,159,296 | 6/1979 | Florea et al. | 264/117 |
| 4,336,219 | 6/1982 | Lamond | 264/117 |
| 4,381,948 | 5/1982 | McConnell et al. | 106/416 |
| 4,770,831 | 9/1988 | Walker | 264/82 |
| 4,826,536 | 5/1989 | Raythatha et al. | 106/465 |
| 4,851,048 | 7/1989 | Jones et al. | 106/446 |

*Primary Examiner*—Richard L. Chiesa
*Attorney, Agent, or Firm*—Kaluber & Jackson

[57] ABSTRACT

Calcined kaolin clay is pelletized in a pelletizer by a process wherein the calcined clay has ammonia added to it, suitably in relatively small amounts such as less than 1% by weight. The pelletized clay is preferably coated with a binder to improve its flowability.

6 Claims, 1 Drawing Sheet

RATE OF COARSE PELLET FORMATION

RATE OF FINES DEPLETION

METHOD FOR PELLETIZING CALCINED CLAY

FIELD OF THE INVENTION

This invention relates to the pelletization of calcined clay and is more particularly concerned with an improved method for pelletizing clay which eliminates the need for a drying step.

In the course of manufacturing paper and similar products, including paperboard and the like, it is well known to incorporate quantities of inorganic materials into the fibrous web in order to improve the quality of the resulting product. In the absence of such "fillers", the resultant paper can have a relatively poor texture due to discontinuities in the fibrous web. The said fillers are also important in improving the printing qualities of the paper, i.e., by improving the surface characteristics of same.

A number of inorganic materials have long been known to be effective for many of the aforementioned purposes. Among the best of these materials is titanium dioxide, which can be incorporated into the paper in the form of anatase or of rutale. Titanium dioxide, however, is among the most expensive materials which are so usable. Thus, despite the effectiveness of such material as a filler, its use is limited, and satisfactory replacements have been much sought after.

Among the materials which have thus found increasing acceptance as paper fillers are calcined kaolin clays. Materials of this type are generally prepared by calcining a crude kaolin clay, which may have been initially subjected to prior beneficiation steps in order to remove certain impurities. Reference may be usefully had to Proctor, U.S. Pat. No. 3,041,836, and to Fanselow, U.S. Pat. No. 3,586,523. More recently, McConnell et al, U.S. Pat. No. 4,381,948 describes an improved process for the preparation of calcined clay.

Thus, to produce a calcined kaolin clay, a crude kaolin clay is blunged and dispersed to form an aqueous dispersion of the same. The blunged and dispersed aqueous slurry is subjected to a particle size separation, from which there is recovered a slurry of the clay. This slurry is then dried to produce a moisture-free clay.

The dried clay is then thoroughly pulverized to break up agglomerates. The pulverized material is then calcined by heating to a temperature of at least 900° C., and under conditions such that substantially none of the clay is heated to a temperature in excess of 1100° C. Thereupon the product of the calcination step is cooled and pulverized. The pulverized material can then be pelletized to improve its handling properties and flowability.

Pelletizing is carried out in standard pelletizing equipment to which the pulverized calcined clay is fed in the presence of significant amounts of water. Typical pelietizers include so-called pan pelletizers, such as manufactured and sold by Mars Equipment Co. Another common pelletizer is the pin mixer referred to in Florea et al, U.S. Pat. No. 4,159,296. During the pelletizing operation, the clay is formed into pellets and the moisture subsequently evaporated in a succeeding drying step. Rotating drums of special construction have also been proposed for pelletization and much of the moisture is eliminated by appropriate heating during the pelletizing operation itself.

Ordinarily, water is added to the calcined clay to be pelletized in an amount to give the wetted calcined clay a moisture content of 30 to 40%, which moisture, must of course, subsequently be eliminated. Water removal requires large amounts of energy.

OBJECTS OF THE INVENTION

It is, accordingly, an object of the invention to provide an improved process for pelletizing calcined kaolin clay.

It is another object of the invention to provide a process of the character indicated which makes it possible to eliminate the drying operation.

It is a further object of the invention to provide a process for pelletizing calcined clay which produces a product of good flowability and handling properties.

SUMMARY OF THE INVENTION

In accordance with the invention, a calcined kaolin clay, such as produced by the process described in the abovementioned McConnell et al, U.S. Pat. No. 4,381,948, is pelletized in a pelletizer by a process wherein the calcined kaolin has added to it relatively small amounts of ammonia, viz. less than 1%.

It has been observed, and it is a feature of the invention, that the speed of pelletizing is significantly increased by reason of the ammonia addition and the conventional drying operation, which is relatively costly and energy intensive, can be eliminated. Further, the amount of fines remaining after pelletization is significantly reduced.

At the same time, the product pelletized calcined clay produced in accordance with the invention in the presence of small amounts of ammonia, has handling characteristics and flowability which compared favorably with pelletized calcined clay produced conventionally in the presence of water.

DETAILED DESCRIPTION OF THE PREFERRED EMBODIMENTS

In carrying out the process of the invention, the pulverized calcined clay is treated with less than 1% by weight, generally 0.05 to 0.2% of ammonia, preferably less than 0.5% by weight, based on the weight of the clay, and is fed into a post calcination grinder such as those mentioned by Proctor, Fanselow, and McConnell.

The ammonia can be in the form of gaseous anhydrous ammonia or in the form of vaporized concentrated ammonium hydroxide, e.g., 30% $NH_3$, preferably the former.

The pelletizing in a pan pelletizer is generally completed in 5 to 15 minutes, which is less than the time generally required for pelletizing calcined clay when moistened with conventional amounts of water. The volatile ammonia is removed by vaporization as the pelletizing proceeds.

Improved pellet strength and flowability is achieved in accordance with the invention by adding to the pelletized, calcined clay a small amount of a binder, which may be a conventional binder such as carboxy methyl cellulose (CMC), hydroxy ethyl cellulose, an alginate, polyvinyl alcohol, polyvinyl pyrrolidone, bentonites, or combinations of these materials. Generally, the binder is employed as an aqueous concentrate of 0.5% to 10% concentration and is sprayed upon the ammonia pelletized calcined kaolin clay pellets.

The following examples will serve to emphasize the features of the invention.

EXAMPLE I

The pulverized calcined clay used was a product sold under the trademark ALPHATEX®, produced by E.C.C. America Inc., assignee of the present application, and produced generally by the process described in McConnell et al, U.S. Pat. No. 4,381,948, the disclosure of which is incorporated herein by reference.

Vaporized ammonia was added to the ALPHATEX in the amount of six pounds per ton and the mixture pelletized in a pan pellatizer operated at 19 RPM.

The product in the pelletizer was subjected to dry sieve analysis after 1, 2, 4 and 8 minutes of residence time to measure pellet size distribution and thereby the rate of pelletization with the following results (all percentages are by weight):

TABLE I

| Mesh | 1 min (%) | 2 min (%) | 4 min (%) | 8 min (%) |
|---|---|---|---|---|
| +35 | 65.1 | 65.5 | 69.2 | 73.4 |
| <35 + 50 | 20.5 | 22.4 | 21.2 | 18.9 |
| <50 | 14.4 | 12.1 | 9.6 | 7.7 |

COMPARATIVE EXAMPLE IA

Following the procedure described in Example 1, ALPHATEX was pelletized in a conventional manner—with no water or ammonia. This sample served as a control. Dry sieve analysis yielded the following results:

TABLE 1A

| Mesh | 1 min (%) | 2 min (%) | 4 min (%) | 8 min (%) |
|---|---|---|---|---|
| +35 | 40.1 | 53.4 | 41.1 | 53.5 |
| <35 + 50 | 37.1 | 24.0 | 30.6 | 22.4 |
| <50 | 22.8 | 22.6 | 28.4 | 24.1 |

Figure 1:
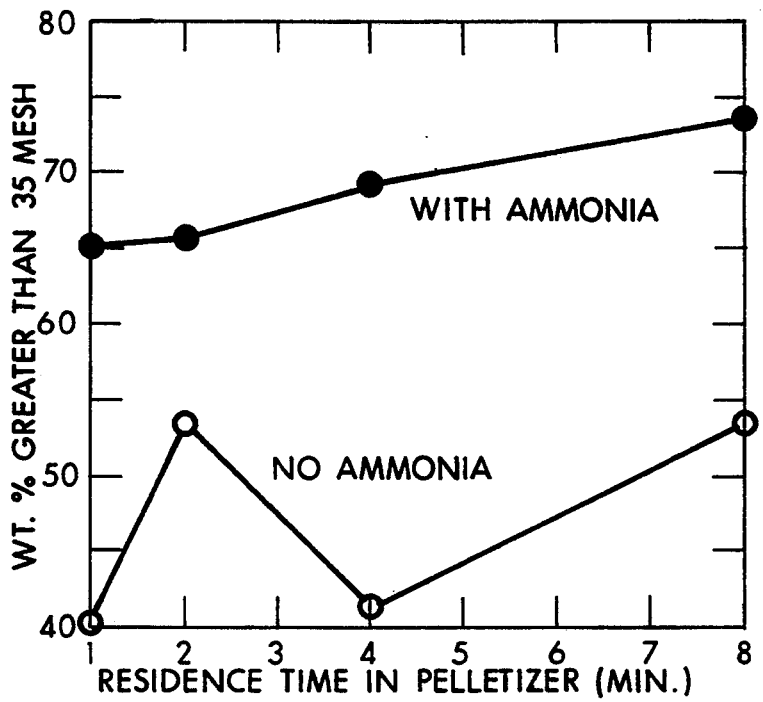
FIGS. 1 and 2 respectively show graphs of the rate of pellet formation and of fines depletion, as a function of time, in the practice of the present invention.
Figure 2:
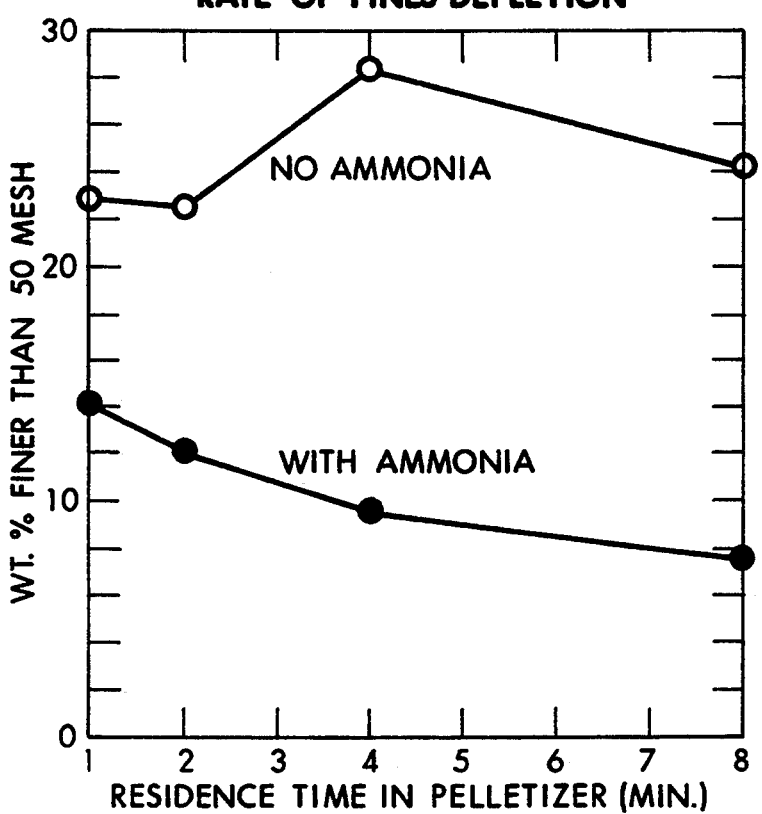

The foregoing data are graphically depicted in the appended FIGS. 1 and 2.

EXAMPLE 2

Example 1 was repeated except that the pelletizer was operated at 10 RPM.

The following results were observed:

TABLE 2

| Mesh | 1 min (%) | 2 min (%) | 4 min (%) | 8 min (%) |
|---|---|---|---|---|
| +35 | 61.6 | 61.6 | 68.9 | 64.9 |
| <35 + 50 | 21.4 | 23.1 | 20.1 | 24.0 |
| <50 | 16.9 | 15.3 | 10.9 | 11.1 |

EXAMPLE 3

Example 1 was again repeated except that the pelletizer was operated at 5RPM.

Sieve analysis at various times gave the following results:

TABLE 3

| Mesh | 1 min (%) | 2 min (%) | 4 min (%) | 8 min (%) |
|---|---|---|---|---|
| +35 | 56.6 | 59.3 | 62.9 | 62.1 |
| <35 + 50 | 20.8 | 22.4 | 22.3 | 24.2 |
| <50 | 22.6 | 18.3 | 14.7 | 13.8 |

EXAMPLE 4

Samples of the pelletized ALPHATEX produced in Example 1 were treated with various amounts of Kelgin (1.1 lb., 1.5 lb., and 2.1 lb. Kelgin per ton ALPHATEX pellets—Kelgin is a trademark of Kelco, San Diego, Calif., for their sodium alginate product) as binder so as to coat the pellets and the coated pellets were measured for flowability using the standard procedure. In this procedure the drop time through a funnel is taken as a measure of flowability. A sample of the product of Example I which was not treated with Kelgin (binder) and a sample of the ammonia treated feed were also measured for flowability for comparison.

The results are shown in Table 4—where the numbers are funnel test drop times measured in seconds.

TABLE 4

| Ammonia Treated Feed | Pelletized No Binder | Pelletized 1.1 lb Kelgin | Pelletized 1.5 lb Kelgin | Pelletized 2.1 lb Kelgin |
|---|---|---|---|---|
| 55 ± 14(5) | 43 + 25(3) | 18 ± 4(5) | 11 ± 5(5) | 9 ± 3(5) |

It will be apparent from the examples that pelletizing in the presence of ammonia in accordance with the invention materially reduces the time for pelletization and that the flowability of the product, even though already comparable to that of conventionally pelletized calcined kaolite, can be materially improved by adding a binder of the character indicated to coat the pellets.

It will be obvious that various changes and modifications may be made without departing from the invention as defined in the appended claims. It is intended, therefore, that all matter contained in the foregoing description be interpreted as illustrative only and not in a limiting sense.

We claim:

1. A process for treating kaolin clay which has been calcined by heating to a temperature of at least 900° C., to improve the bulk handling and flow characteristics, which comprises: adding ammonia to said calcined kaolin clay in the form of gaseous anhydrous ammonia or of vaporized concentrated ammonium hydroxide, and thereafter pelletizing the ammonia-treated product.

2. A process as defined in claim 1, wherein said ammonia is added in an amount of less than 1% by weight of said clay.

3. A process as defined in claim 1, wherein said ammonia is added in an amount of less than 0.5% by weight of said clay.

4. A process as defined in claim 1, wherein said ammonia is added in an amount of 0.05 to 0.5% by weight of said clay.

5. A process as defined in claim 1, wherein said pelletized calcined kaolin clay is thereupon coated with a binder.

6. A process as defined in claim 5, wherein said binder is selected from one or more members of the group consisting of carboxy methyl cellulose, hydroxy ethyl cellulose, alginate, polyvinyl alcohol, polyvinyl pyrrolidone, and bentonites.

* * * * *